US009977686B2

(12) United States Patent
Tokunaga et al.

(10) Patent No.: US 9,977,686 B2
(45) Date of Patent: May 22, 2018

(54) APPARATUS FOR ALLOCATING FUNCTIONS TO EACH OF ELECTRONIC CONTROL UNITS OF A VEHICLE (71) Applicant: DENSO CORPORATION, Kariya, Aichi-pref. (JP)

(72) Inventors: Tomoya Tokunaga, Kariya (JP); Hidetoshi Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 748 days.

(21) Appl. No.: 14/285,981

(22) Filed: May 23, 2014

(65) Prior Publication Data
US 2014/0350911 A1 Nov. 27, 2014

(30) Foreign Application Priority Data

May 24, 2013 (JP) .................. 2013-109952

(51) Int. Cl.
*G06F 9/455* (2018.01)
*B62D 65/00* (2006.01)
*B60W 50/00* (2006.01)

(52) U.S. Cl.
CPC ............. *G06F 9/455* (2013.01); *B60W 50/00* (2013.01); *B62D 65/00* (2013.01); *B60W 2050/0018* (2013.01); *Y02T 10/82* (2013.01)

(58) Field of Classification Search
CPC ........ G06F 17/50; G06F 9/455; B60W 50/00; B60W 2050/0018; B62D 65/00; Y02T 10/82
See application file for complete search history.

(56) References Cited

U.S. PATENT DOCUMENTS

| 6,282,578 | B1 * | 8/2001 | Aizono | .................. | G06F 9/445 719/310 |
| 2005/0216135 | A1 * | 9/2005 | Sayama | .................. | B60R 16/03 701/1 |
| 2006/0184345 | A1 | 8/2006 | Belschner et al. | | |
| 2008/0271035 | A1 * | 10/2008 | Yasukawa | ............. | G06F 1/3203 718/104 |
| 2011/0245934 | A1 | 10/2011 | Yasuda | | |

FOREIGN PATENT DOCUMENTS

JP 2011-210174 A 10/2011
WO 2010-073313 A1 7/2010

OTHER PUBLICATIONS

Office Action dated Apr. 28, 2015 in the corresponding JP application No. 2013-109952 (English translation attached).

* cited by examiner

*Primary Examiner* — Omar F Fernandez Rivas
*Assistant Examiner* — Justin C Mikowski
(74) *Attorney, Agent, or Firm* — Posz Law Group, PLC (57) ABSTRACT

An ECU (Electronic Control Unit) evaluation apparatus, for use in vehicle design, allocates functions appropriately to respective ECUs of a vehicle. The function allocation can be performed based on user-specified priority aspect(s) in conjunction with stored information concerning the respective functions and information concerning the ECUs, such as installation positions on the vehicle, mechanical and electrical specifications of component parts of ECUs, etc.

12 Claims, 5 Drawing Sheets

APPARATUS FOR ALLOCATING FUNCTIONS TO EACH OF ELECTRONIC CONTROL UNITS OF A VEHICLE

CROSS-REFERENCE TO RELATED APPLICATIONS

This application is based on and incorporates herein by reference Japanese Patent First Application No. 2013-109952 filed on May 24, 2013.

BACKGROUND OF THE INVENTION

Field of Application

The present invention relates to an ECU (Electronic Control Unit) evaluation apparatus for use in the design of motor vehicles.

Description of Related Art

Present-day motor vehicles incorporate a number of ECUs installed at various locations in the vehicle, having respective functions relating to operations of the vehicle (e.g., control of fuel pump operation, control of operating electrically powered windows, etc.). Each ECU is connected to other electrical equipment of the vehicle via interface circuits and wiring (part of the wiring harness of the vehicle). Techniques are known in the prior art for use when designing vehicles, employing computer processing to determine the layout paths of the wiring harness based on the locations of the ECUs that are installed in the vehicle, and to select various component parts (such as wiring leads, connectors, tubing, etc.,) required in the design of the wiring harness, and also to evaluate amounts of cost and weight of the component parts, and wiring path lengths of the wiring harness. The selection of the component parts is made based upon information concerning the respective locations of the lead paths of the wiring harness (e.g., allowable temperature values, whether waterproofing is necessary, etc.,) and may also be made based on information concerning each of the ECUs which are to be connected to the wiring harness (e.g., whether a stabilized current supply is required by an ECU, etc.,). An example of such a technique for use in designing a wiring harness is described in Japanese patent publication No. 2011-210174.

However with such prior art technology, design of the wiring harness is performed only after functions have been allocated to the respective ECUs. Since the ECUs are located at various positions throughout a vehicle, the allocation of functions to the ECUs has a considerable effect on the design of the wiring harness. Hence, if evaluation processing for designing a suitable wiring harness is performed based on a pre-existing allocation of respective functions to the ECUs, optimum results cannot be expected.

SUMMARY OF THE INVENTION

Hence it is desired to overcome the above problem by providing an ECU evaluation apparatus, for use during vehicle design, to facilitate the allocation of functions to respective ECUs installed at various locations in a vehicle.

Such an ECU evaluation apparatus comprises a function allocation section, a component part selection section, an evaluation amount calculation section and an evaluation section, which are preferably respectively implemented by a computer, through execution of a program held stored in a memory apparatus of the computer.

The function allocation section allocates functions, to be executed by the respective ECUs of the vehicle, in a function allocation pattern. The component part selection section selects the component parts which are required to constitute each of the ECUs, the selection being performed based on the functions that are allocated to the respective ECUs by the function allocation pattern which is currently set. In relation to that currently set pattern, the evaluation amount calculation section calculates evaluation amounts for various different categories (cost, size, weight, etc.,) for each ECU, e.g., the total cost of the ECU of that function allocation pattern were to be applied, the total weight, etc. The evaluation section evaluates the suitability of each function allocation pattern, based upon the evaluation amounts obtained with respect to that pattern.

In addition preferably, the ECU evaluation apparatus is provided with an input device (e.g., keyboard, etc.,) operable by a user for specifying (to the function allocation section) an aspect which is to be given priority when allocating the functions to the ECUs. For example, priority may be given to the aspect of minimizing the total cost of all of the ECUs, or minimizing the total weight of all of the ECUs, etc. Alternatively, a plurality of aspects may be specified, having respective degrees of priority. Selection of a function allocation pattern is performed based on the evaluation amounts obtained with respect to each function allocation pattern, to establish a function allocation pattern which is most suitable matched to the desired priority aspect(s).

The function allocation section may be configured to predetermine a plurality of respectively applicable function allocation patterns, and to successively apply each of these in turn to the ECUs. An optimum function allocation pattern is then determined based on judging the respective sets of evaluation amounts thereby obtained, corresponding to the various function allocation patterns.

Alternatively, the evaluation amounts corresponding to a currently applied function allocation pattern may be judged with respect to a predetermined termination condition. If it is judged that the evaluation amounts satisfy the termination condition, the currently applied function allocation pattern is determined as being suitable. Otherwise, that function allocation pattern is modified by applying an algorithm, which is preferably selected based upon one or more desired priority aspect(s), and the evaluation process then repeated for the modified function allocation pattern.

DESCRIPTION OF PREFERRED EMBODIMENTS

Figure 1:
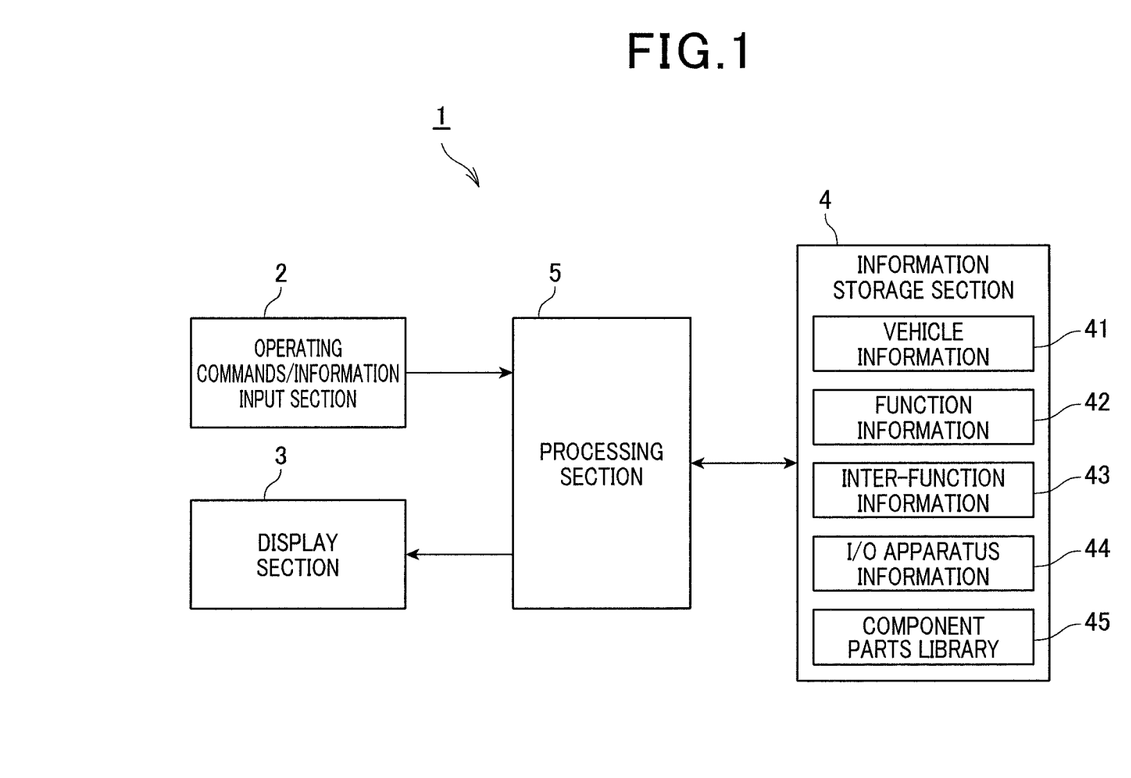
FIG. 1 is a general block diagram of an ECU evaluation apparatus according to the present invention.

A first embodiment of an ECU evaluation apparatus, designated by numeral 1, will be described referring first to the general system block diagram of FIG. 1.

As shown, the ECU evaluation apparatus 1 is equipped with an operating commands and information input section 2, a display section 3, an information storage section 4 and a processing section 5. The operating commands and information input section 2 consists of a keyboard, pointing device, etc, enabling a user to input commands and information for operating the apparatus. The operating commands and information input section 2 also includes a communication interface for use in communicating directly or via a network with other equipment (for example, computers or measuring apparatuses), and a readout apparatus for reading out information from various data storage media. Necessary information can thereby be inputted or obtained by the user.

The display section 3 consists of a display apparatus such as a LCD (liquid crystal display) apparatus, for enabling the user to input commands and information via the operating commands and information input section 2, and for generating result presentation displays which present the results of processing executed by the processing section 5, etc. It should be noted that it would be possible to implement the operating commands and information input section 2 and display section 3 in combination, by a touch-pad (touch input) type of display apparatus.

The information storage section 4 consists of data storage devices such as a hard disk, a semiconductor memory such as a USB (Universal Serial Bus) connectable type of removable memory, etc., and stores various types of information used in processing by the processing section 5 as described hereinafter. The information stored in the information storage section 4 can consist of information read in from external devices via the operating commands and information input section 2. If the information storage section 4 is implemented as a removable type of memory device, the stored information can be updated by replacing these memory devices.

The processing section 5 consists of a usual type of microcomputer based on a CPU, ROM, RAM, etc., and performs evaluation processing by executing a program which has been stored beforehand in the ROM. The evaluation is executed for assigning functions to each of the ECUs of a specific type of vehicle, at a time of designing that type of vehicle. The evaluation is performed based on commands and information that are inputted by a user via the operating commands and information input section 2, and in accordance with information which has been stored beforehand in the information storage section 4.

Information Held in Data Storage Section

The information storage section 4 includes, at least, a vehicle information section 41, a function information section 42, an inter-function information section 43, an I/O information section 44, and a component parts library 45.

In the following, the respective functions which can be allocated to an ECU are referred to as unit functions.

The vehicle information section 41 consists of sets of information respectively provided for each of various types of vehicle. Specifically (with respect to each vehicle type) the vehicle information section 41 includes information specifying the number of ECUs that are installed on a vehicle, information relating to spaces required for the installed ECUs on the vehicle (location on the vehicle, size, whether waterproofing is required, etc.), and information relating to wiring layout paths between the spaces in which the ECUs will be installed (path length, whether waterproofing is required, etc).

The function information section 42 consists of sets of information respectively provided for each of the unit functions. Each information set includes information concerning necessary memory requirements (RAM and/or ROM memory size) for the program executed to implement the unit function, and the processing load imposed by executing the program. The information also specifies circuits and component parts (actuators, sensors, drive circuits for these, etc.,) required for implementing the function.

The inter-function information section 43 consists of sets of information respectively corresponding to each of the unit functions. Each information set consists of electrical specifications, including the specifications for any interfaces which may be required by an ECU which is to execute that unit function, and the specifications for a stabilized voltage circuit and/or a stabilized current circuit, if required by an ECU which is to execute that unit function.

The I/O information section 44 consists of sets of information respectively provided for each I/O (Input/Output) apparatus which is used for purposes such as control of a unit function, etc. The information consists of electrical specifications for the interface(s) required by an ECU which utilizes the I/O apparatus, and the specifications for a stabilized voltage circuit and/or a stabilized current circuit if required by such an ECU for use with the I/O apparatus.

The component parts library 45 consists of sets of information provided for each of respective component parts used to constitute the ECUs. These component parts consist of mechanical components and electrical components required for implementing the various unit functions, i.e., microcomputers, circuit baseboards, connectors, tubing, etc. For each component part, the information specifies the size, weight, cost, environmental requirements (operating temperature range, whether waterproofing is required), etc.

ECU Evaluation Processing

Figure 2:
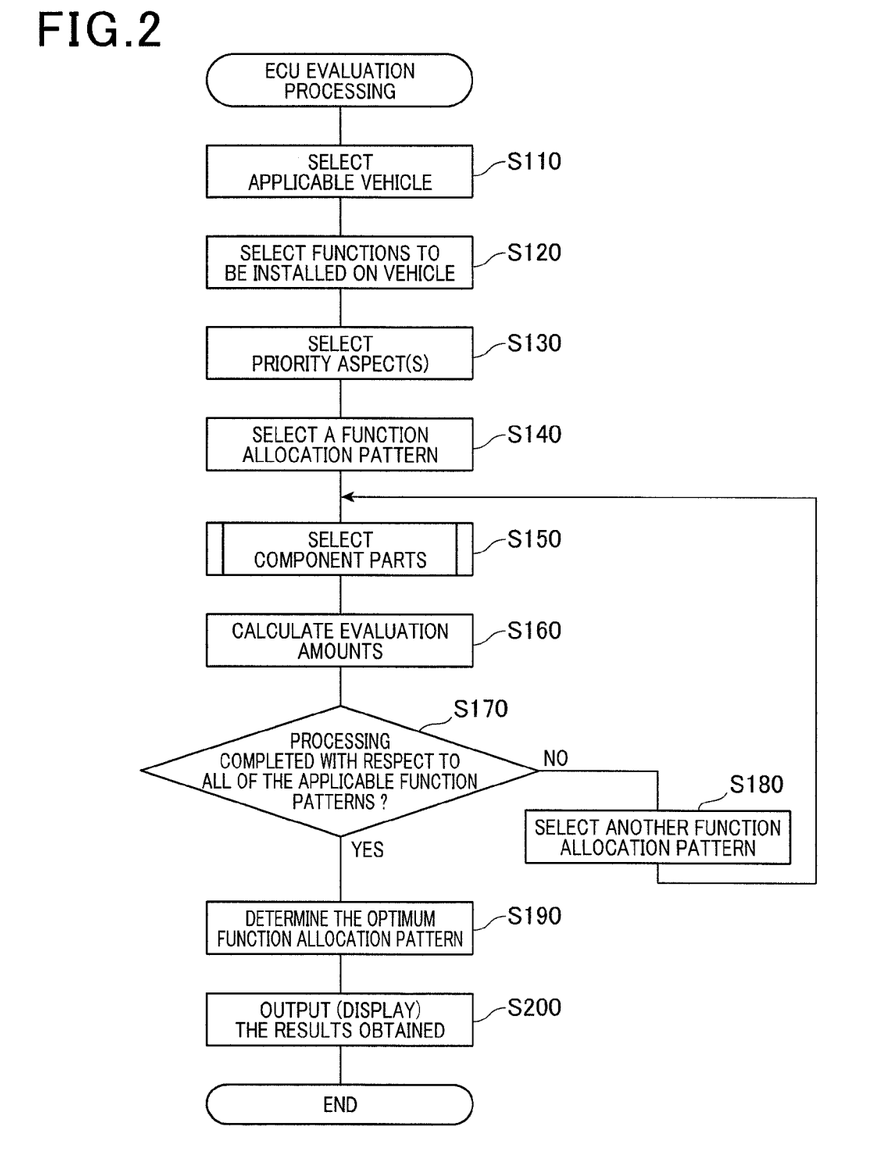
FIG. 2 is a flow diagram of ECU evaluation processing executed by a first embodiment.

ECU evaluation processing by the processing section 5 will be described referring to the flow diagram of FIG. 2. This processing is performed by executing the program held in the ROM of the processing section 5. With this embodiment, execution of the processing begins when an activation command is inputted by a user, via the operating commands and information input section 2.

Firstly (step S110), the applicable vehicle is determined, i.e., the type of vehicle to which the processing will be applied. A vehicle selection display is generated by the display section 3, and the user then inputs selection results via the 2, specifying the applicable vehicle.

Next (step S120), the installed functions are selected. These are the unit functions that are to be installed in the applicable vehicle. An installation function selection display is generated by the display section 3, and the user then inputs selection results via the operating commands and information input section 2, which specify the unit functions to be installed.

Next (step S130), one or more priority aspects are selected. An aspect selection display is generated by the display section 3, and the user of the apparatus then inputs selection results via the operating commands and information input section 2, specifying the desired aspects. Evaluation can be performed for example from the aspect of assigning priority to minimizing costs, or from the aspect of assigning priority to minimizing fuel consumption, or assigning priority to minimizing weight amounts, or to minimizing the amount of wiring required for interfacing, etc. A single priority aspect may be specified, or a plurality of aspects having respective degrees of priority may be specified.

Next (step S140), an applicable function allocation pattern is determined, expressing how the various functions are to be assigned to the respective ECUs of the applicable vehicle. The function allocation patterns which are applicable are determined based on the applicable vehicle selection that has been made in step S110 and on the unit functions that have been selected (in step S120) to be installed.

The selected unit functions are allocated such as to match the number of ECUs installed on the applicable vehicle (expressed in the function information 41). More specifically, each of the applicable function allocation patterns is predetermined in relation to the number of installed ECUs such that (if the function allocation pattern is applied) all of the requisite functions can be executed by these ECUs.

The allocation of the unit functions to respective ECUs (i.e., preparation of any specific function allocation pattern) may be performed by randomly allocating functions to the ECUs. Alternatively, (when one or more priority aspects have been selected as with this embodiment) restrictions on the allocation may be set based on the selected aspect(s).

Next, a component selection step S150 is repetitively executed, for each of the ECUs in turn. Information is thereby obtained concerning the component parts which would be required to constitute each ECU with the currently selected function allocation pattern.

Figure 3:
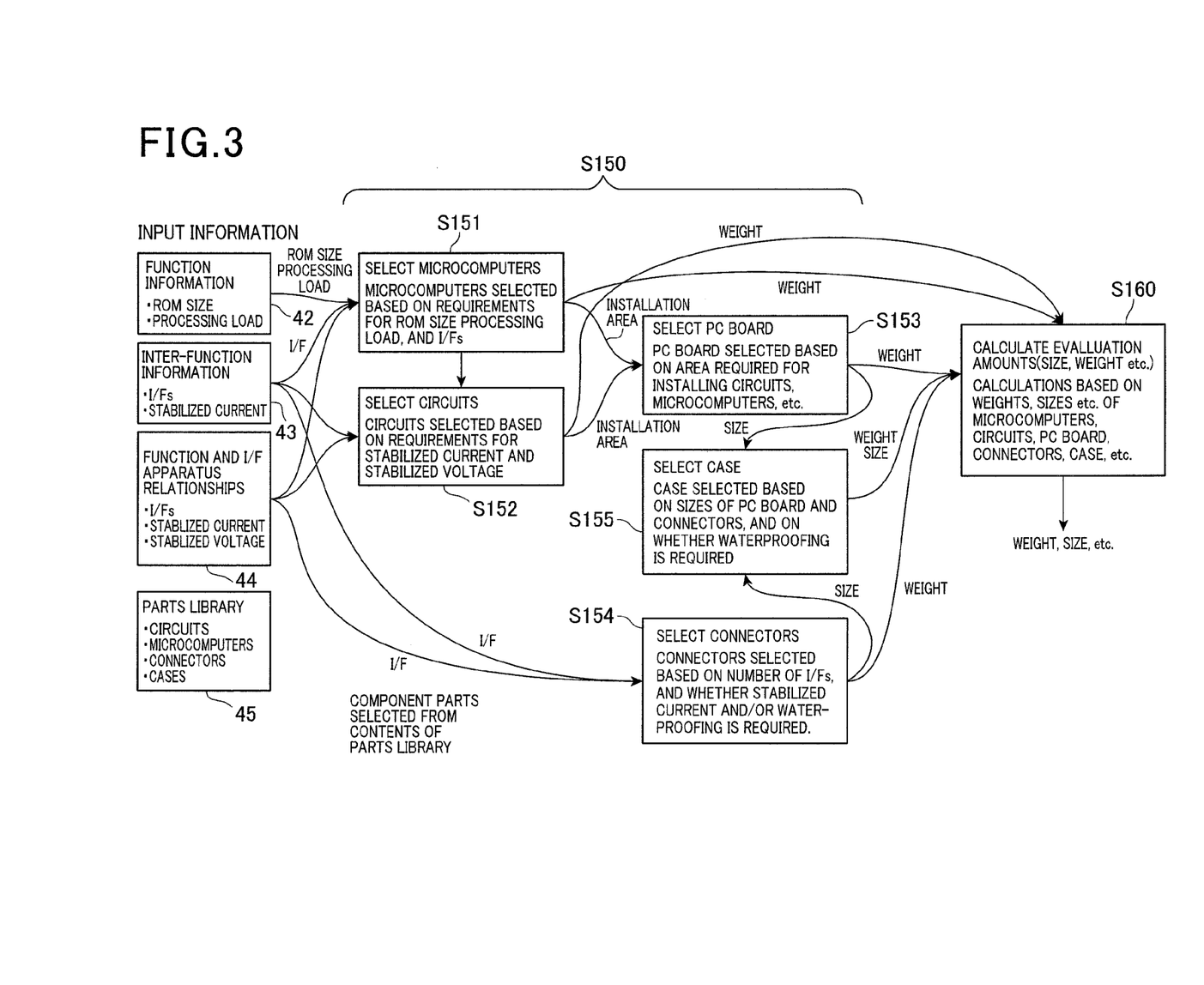
FIG. 3 is a flow diagram showing details of processing for selecting component parts of an ECU, and illustrating relationships between the selection processing and various information used in the selection processing.

FIG. 3 conceptually illustrates the flow of processing executed in step S150 with respect to the function allocation pattern which is currently selected. The processing of steps S151 to S155 shown in FIG. 3 is executed successively for each of the installed ECUs, i.e., is executed a number of times equal to the total number of ECUs specified in the vehicle information section 41 for the applicable vehicle.

Firstly (step S151), the processing section 5 selects the microcomputers to be installed in the ECU. This selection is made based upon the necessary capacity of ROM that will be required for executing the unit function to be performed by this ECU and the processing load that will be imposed in execution the function (that information being acquired from the function information section 42), and upon the electrical specifications required for that unit function (information acquired from the inter-function information section 43 and I/O information section 44).

Next, (step S152) electronic circuits (e.g., stabilized current circuit, stabilized voltage circuit, interface circuits, etc.,) which are to be installed in the ECU are selected. This selection is performed based upon the type of unit function which is to be executed by the ECU (acquired from the function information section 42) and the necessary electrical specifications for the ECU (acquired from the inter-function information section 43 and from the I/O information section 44).

Next, (step S153) the printed circuit board (i.e., ECU motherboard) is selected on which the microcomputers and any electronic circuits (stabilized current circuit, stabilized voltage circuit, etc.,) which have been selected in steps S151 and S152, will be mounted, with the selection being performed based on the area which will be necessary for accommodating these. Size information on these component parts is acquired from the component parts library 45.

Next, (step S154) the connectors which are to be installed on the ECU are selected. This selection is performed based on the electrical specifications to be met by the ECU (information acquired from the inter-function information section 43 and from the I/O information section 44) and on whether or not waterproofing is required (determined based on the location where the ECU is installed on the vehicle, with the location information being obtained from the vehicle information section 41), etc.

Next, (step S155) the case which will contain the ECU is selected. The case selection is made based on the size of the printed circuit board (selected in step S153) and the sizes of the connectors which have been selected in step S154 (the size information being acquired from the component parts library 45), and on information as to whether the case is required to be waterproof, as determined by the location where the ECU is installed on the vehicle (obtained from the vehicle information section 41).

Next (step S160), when the processing of step S150 is completed for an ECU with respect to its allocated unit function, with all of the necessary component parts of the ECU having thereby been specified, information (size, weight, cost, etc.,) concerning these component parts is then read out from the component parts library 45. That information is used calculate a set of values for the ECU, referred to in the following as evaluation amounts. With this embodiment, evaluation amounts (obtained for an ECU in relation to a specific allocated unit function) are obtained for the respective categories of total weight, overall size, total cost, total power consumption, and total number of component parts of the ECU. These calculated evaluation amounts are temporarily registered for use in subsequent processing (executed in step S190 as described hereinafter).

The processing of steps S150 and S160 is repeated, for each of the remaining ECUs in relation to their allocated unit functions. A set of evaluation amounts (i.e., evaluation amounts obtained for the respective categories) is thereby obtained and registered in executions of steps S150 and S160, for each of the ECUs, with respect to the function allocation pattern which is currently applied.

Next, (step S170) a decision is made as to whether the processing of steps S150 to S160 has been executed for all of the applicable function allocation patterns. If processing has not yet been executed for one or more of these function allocation patterns (NO decision in step S170), a new applicable function allocation patterns is selected (step S180) and processing returns to step S150. The repetitive processing of steps S150 and S160 described above is then again executed, for the case of functions being allocated to the ECUs in accordance with the new function allocation pattern.

Sets of evaluation amounts respectively corresponding to the ECUs, with respect to the new function allocation pattern, are thereby obtained and registered.

When it is judged that the processing of steps S150 to S160 has been executed for all of the applicable function allocation patterns (YES decision in step S170) operation proceeds to step S190. The processing contents of step S190 can be as shown in the flow diagram of FIG. 5. Firstly (step S190a) a set of weighting factors respectively corresponding to the categories of the evaluation amounts (i.e., corresponding to cost, power consumption, etc.,) are calculated based on the aspect(s) selected in step S130. One of the applicable function allocation patterns is then selected (steps S190b).

Figure 5:
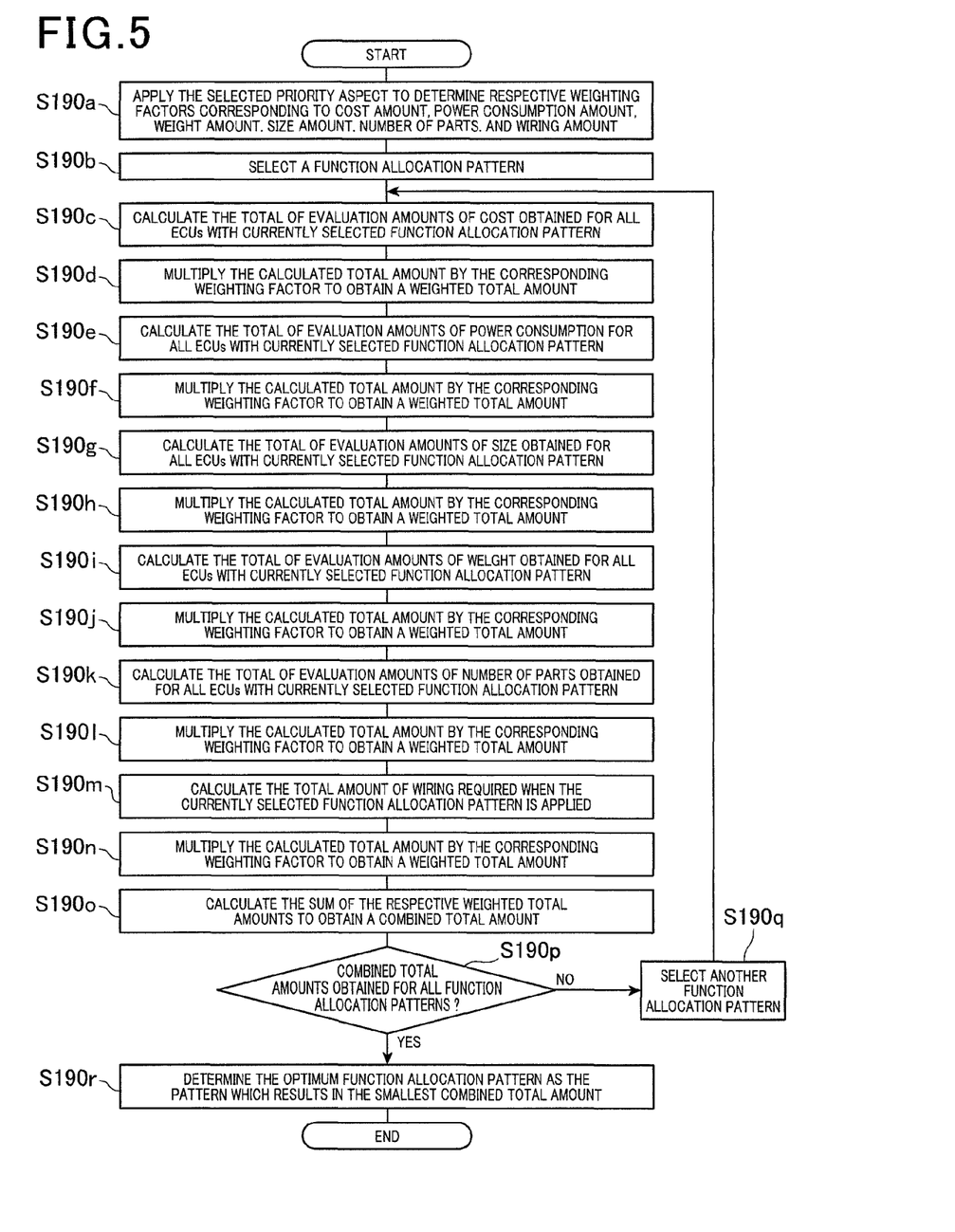
FIG. 5 shows details of a processing step in the flow diagram of FIG. 2.

Next (step S190c), the respective evaluation amounts of cost obtained for all of the ECUs (with the currently selected function allocation pattern applied) are summed to obtain a total evaluation amount of cost with respect to that function allocation pattern. That amount is then multiplied by the corresponding weighting factor, to obtain a weighted total amount of cost.

Similarly, (steps S190e to S190l) weighted total amounts of power consumption, weight, size, cost, and number of component parts are calculated with respect to the selected function allocation pattern.

In addition with this embodiment, the amount of wiring which would be required for implementing the selected function allocation pattern is also calculated (step S190m) and multiplied by a corresponding weighting factor, to obtain a corresponding weighted total amount (step S190n). The total amount of wiring is calculated based on information concerning required interfaces for the ECUs, and on the respective positions at which the ECUs are to be installed on a vehicle.

The sum total of the respective weighted total amounts is then calculated (step S190o) to obtain a value referred to as the combined total amount, with respect to the selected function allocation pattern.

When respectively corresponding combined total amounts have thereby been obtained for all of the applicable function allocation patterns (YES decision in step S190p), these combined evaluation amounts are compared The function allocation pattern which has the smallest value of corresponding combined evaluation amount is then determined as being the optimum pattern, i.e., which is most suitably matched to the specified priority aspect(s) (step S190r).

After completion of step S190, step S200 is executed in which the optimum function allocation pattern determined in step S190, and evaluation amount information corresponding to that function allocation pattern, are outputted, for example by being displayed to the user by the display section 3. This execution of the ECU evaluation processing is then ended.

In the above description, it is assumed that the only function allocation pattern which is outputted is that for which the combined evaluation amount is the smallest. However it would be equally possible to output each of respective function allocation patterns which satisfy predetermined minimum conditions, e.g., each function allocation pattern for which the corresponding combined evaluation amount is below a predetermined threshold value.

Furthermore in the above description it is assumed that respective combined evaluation amounts are obtained for each of a plurality of applicable function allocation patterns, and that the determination of an optimum function allocation pattern is made by comparing these combined evaluation amounts. However it would be possible to utilize other methods of determining an optimum function allocation pattern, based upon the selected priority aspect(s) and upon the respective sets of evaluation amounts which are obtained, corresponding to the function allocation patterns, by the processing of steps S150 and S160.

Effects

With the above embodiment, each of a plurality of possible patterns of allocating respective functions to the ECUs which are to be installed on a vehicle can readily be evaluated from a desired priority aspect, or from a plurality of priority aspects. As a result, vehicle design can be effectively facilitated.

Second Embodiment

A second embodiment will be described in the following. Since the second embodiment differs from the first embodiment only with respect to a part of the ECU evaluation processing executed by the processing section 5, the description of the second embodiment is centered on the points of difference from the first embodiment.

ECU Evaluation Processing

Figure 4:
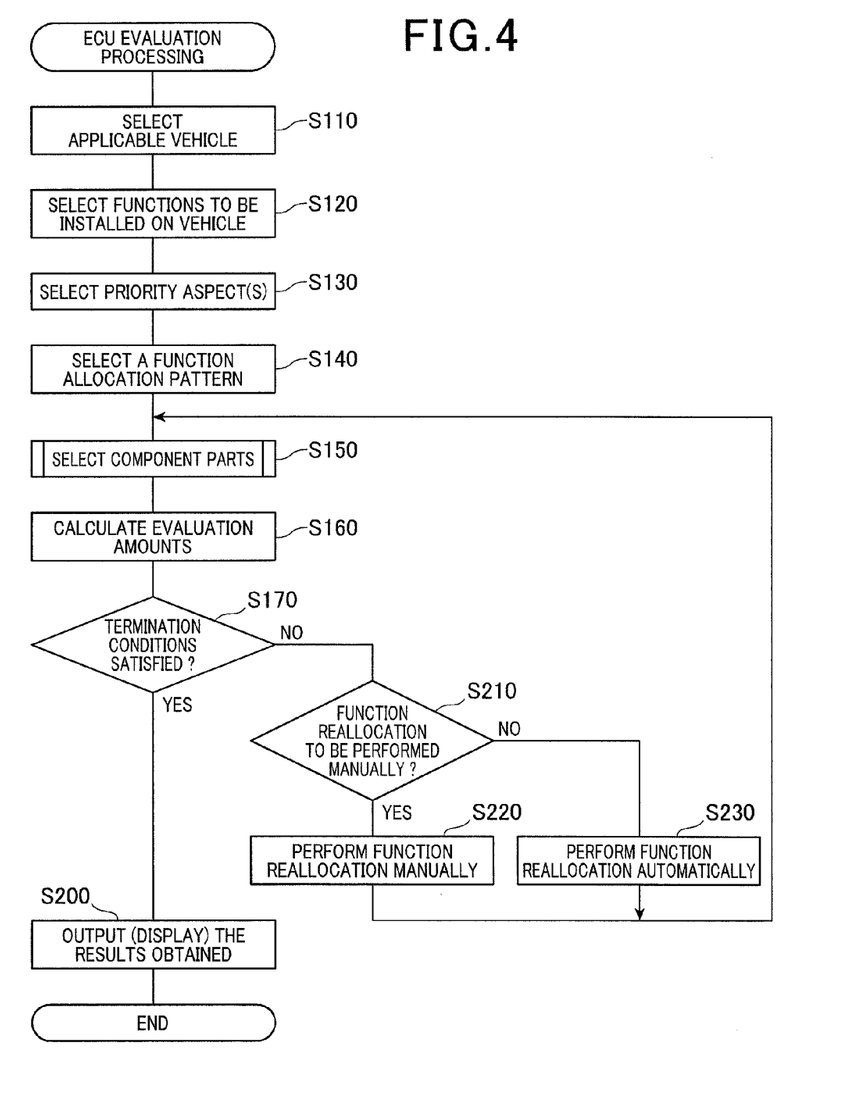
FIG. 4 is a flow diagram of ECU evaluation processing executed by a second embodiment.

FIG. 4 is a flow diagram of the ECU evaluation processing executed with the second embodiment. The processing of steps S110 to S160 is identical to that of the first embodiment.

With the second embodiment, after a function allocation pattern has been selected by executing step S140, and a set of evaluation amounts for all of the ECUs with respect to that function allocation pattern has been obtained (by the processing of steps S150, S160 as described for the first embodiment), a decision is made (step S175) as to whether the evaluation amounts satisfy a predetermined termination condition (or set of predetermined termination conditions). The termination condition is predetermined in accordance with the aspect selected in step S130.

As a specific example, a combined evaluation amount may be derived for the selected function allocation pattern, as described above for the first embodiment, with the termination condition being satisfied if the combined evaluation amount is below a predetermined upper limit value.

If the termination condition is satisfied (YES in step S175), this is taken to indicate that the function allocation pattern which is currently set is suitable. In that case, the function allocation pattern is outputted (displayed) together with the evaluation amounts that have been calculated for each of the ECUs. This execution of the ECU evaluation processing is then ended.

If the termination condition is not satisfied (NO in step S175), a decision is made (step S210) as to whether manual operation is to be performed. The apparatus can be configured such that this decision is made based on initial setting operations, which are performed separately. Alternatively the decision could be made by a user, by inputting a response to an enquiry display, generated by the display section 3 at the time when step S210 is executed.

If manual operation is selected (YES in step S210), processing is executed for enabling manual allocation (step S220). Specifically, a function allocation alteration display is generated by the display section 3, and processing is executed whereby the user can then allocate functions to the respective ECUs, by inputting information and commands via the operating commands and information input section 2.

If manual operation is not selected (NO in step S210), processing is executed for performing function allocation automatically (step S230)

In that case, setting of a new function allocation pattern is performed by executing a reallocation algorithm, selected in accordance with the aspect(s) selected in step S130.

For example, if the selected aspect assigns priority to minimizing costs, then the function allocation achieved by the reallocation algorithm can be such that the processing load on each of the ECUs does not exceed a predetermined upper limit value, thereby making it unnecessary to utilize expensive microcomputers. The function allocation could also be executed such that related functions are combined, to minimize costs.

On the other hand, if the selected aspect gives priority to minimizing size, then the reallocation algorithm could ensure that the size of each ECU does not exceed a predetermined upper limit value, while ensuring that the processing to be executed by each ECU is within its capabilities (i.e., is within the limitations imposed by the size of the ECU, such as maximum allowable power dissipation). Alternatively, a plurality of functions having a high load factor could be assigned to the same ECU, while functions having a low load factor could be assigned to respectively separate ECUs.

Effects

With the second embodiment, as for the first embodiment, different patterns of allocation of unit functions to the ECUs of a vehicle can readily be evaluated based on one or more aspects which is/are to be given priority. As a result, the time and cost requirements of vehicle design can be reduced.

In addition with the second embodiment, function allocation patterns are evaluated individually, and processing is ended when a pattern is determined which satisfies a predetermined termination condition. This enables a shortening of the time required to find a suitable function allocation pattern.

Alternative Embodiments

The invention has been described above with respect to specific embodiments, however the scope of the invention is not limited to these, and various modifications of these embodiments, or alternative forms of the embodiments, may be envisaged. For example, a unit function having a single constituent element could be divided among a plurality of constituent elements, or a unit function having a plurality of constituent elements could be unified to have only a single constituent element. Furthermore, at least a part of either of the above embodiments could be replaced by a constituent which is known in the prior art and has an identical function to the replaced part.

In the above description of embodiments, possible variants of the unit functions have not been specifically mentioned. If a unit function has a plurality of selectable variants, then not only the setting of the function allocation pattern but also selection (change) of a variant of the unit function could be performed in accordance with the selected aspect or aspects.

Hence it should be understood that the scope claimed for the invention, as set out in the appended claims, is not limited by the specific configurations of the above embodiments.

With respect to the appended claims, a function allocation section as claimed corresponds to the processing section 5 in conjunction with the vehicle information section 41, function information section 42 and inter-function information section 43, in executing the processing of steps S120 to S140 and S180. A component part selection section as claimed corresponds to the processing section 5 in conjunction with the component parts library 45, in executing the processing of step S150. An evaluation amount calculation section as claimed corresponds to the processing section 5 in executing the processing of step S160, and an evaluation section as claimed corresponds to the processing section 5 in executing the processing of step S190.

What is claimed is:

1. An ECU (Electronic Control Unit) evaluation apparatus for allocating functions to a plurality of ECUs installed at respective predetermined ECU installation positions in a vehicle, the apparatus comprising:
    an input device, a memory; and
    at least one microcomputer coupled to the memory and the input device, wherein the memory comprises program code stored beforehand in the memory, which, when executed by the microcomputer, causes the at least one microcomputer to execute the following:
        a function allocation section configured for allocating the plurality of functions to respective ones of the ECUs;
        a component part selection section configured for selecting component parts to constitute each of the ECUs, the selection performed in accordance with the functions allocated to the respective ECUs by the function allocation section;
        an evaluation amount calculation section configured for calculating evaluation amounts with respect to each of the ECUs, the evaluation amounts comprising at least one of an estimated size of the ECU, an estimated weight of the ECU, an estimated cost of the ECU, an estimated power consumption of the ECU, and an estimated number of component parts of the ECU; and,
        an evaluation section configured for evaluating a suitability of the allocation of functions by the function allocation section, the evaluation based upon the evaluation amounts calculated by the evaluation amount calculation section;
    wherein
    the input device is operable by a user for specifying at least one aspect of the plurality of ECUs as an aspect to be assigned a relatively high priority when allocating the functions to the ECUs;
    the function allocation section is configured to predetermine a plurality of patterns of allocation of the plurality of functions to the ECUs, and to apply each of the function allocation patterns in succession to the ECUs for thereby obtaining from the evaluation amount calculation section a plurality of sets of evaluation amounts, the plurality of sets of evaluation amounts respectively corresponding to the function allocation patterns,
    the evaluation amount calculation section is configured to determine, in accordance with the specified aspect, a plurality of weighting factors corresponding to respective categories of the evaluation amounts and, for each of the function allocation patterns, multiply each of the corresponding evaluation amounts by the corresponding weighting factor, to obtain respective weighted evaluation amounts, and calculate a sum total of the weighted evaluation amounts corresponding to the function allocation pattern, and
    the evaluation section is configured to compare the respective values of sum total of weighted evaluation amounts obtained for the function allocation patterns, and determine an optimum function allocation pattern as a function allocation pattern corresponding to a smallest value of sum total of weighted evaluation amounts, and
    the evaluation amount calculation section is configured to allocate the plurality of functions to the ECUs in accordance with the optimum function allocation pattern;
    determining wiring for wiring paths of a wiring harness connecting the ECUs in the vehicle, and thereafter
    applying the optimum function allocation pattern which is determined to the ECUs installed at respective predetermined ECU installation positions in the vehicle by configuring each ECU with functions based on the optimum function allocation pattern.

2. The ECU evaluation apparatus as claimed in claim 1, wherein the function allocation section is configured to reallocate the plurality of functions to be executed by respective ECUs, when the evaluation section determines that a currently selected pattern of allocation of the plurality of functions to the ECUs is unsuitable.

3. The ECU evaluation apparatus as claimed in claim 1 wherein the specified aspect is selected from a group including an aspect of minimizing a total amount of cost of all of the ECUs, an aspect of minimizing a total amount of weight of all of the ECUs, an aspect of minimizing a total power consumption of all of the ECUs an aspect of minimizing a total amount of size of all of the ECUs, and an aspect of minimizing a total number of component parts of all of the ECUs.

4. The ECU evaluation apparatus as claimed in claim 2, wherein the evaluation section is configured to judge the evaluation amounts obtained for the currently applied function allocation pattern in relation to a predetermined termination condition, and to determine that the currently applied function allocation pattern is unsuitable when the evaluation amounts do not satisfy the termination condition.

5. The ECU evaluation apparatus as claimed in claim 4 comprising an input device operable by a user for specifying, to the function allocation section, at least one an aspect of the plurality of ECUs as an aspect to be assigned a relatively high priority when allocating the plurality of functions to the ECUs, when the evaluation amounts do not satisfy the termination condition.

6. The ECU evaluation apparatus as claimed in claim 1, comprising a function reallocation section configured for modifying a currently applied function allocation pattern when the evaluation section determines that the currently applied function allocation pattern is unsuitable, the modification performed by executing an algorithm selected based upon the specified aspect(s).

7. The ECU evaluation apparatus as claimed in claim 1, wherein the function allocation section, the component part selection section, the evaluation amount calculation section and the evaluation section are respectively implemented by a computer in executing a program stored beforehand in a memory apparatus.

8. The ECU evaluation apparatus as claimed in claim 1, wherein
the evaluation section is further configured to determine whether the evaluation amounts obtained for the plurality of sets of evaluation amounts respectively corresponding to at least one of the function allocation patterns satisfy a predetermined termination condition, and to determine that the at least one of the function allocation patterns is unsuitable when the evaluation amounts do not satisfy the predetermined termination condition,
when the evaluation section determines that at least one of the function allocation patterns for allocation of the plurality of functions to the plurality of ECUs is unsuitable, the function allocation section is further configured to reallocate, in the function allocation patterns, the plurality of functions to be executed by respective ECUs, and to again execute the evaluation section with the function allocation patterns which are reallocated by the function allocation section.

9. The ECU evaluation apparatus as claimed in claim 8, wherein
the predetermined termination condition is satisfied when the evaluation amounts of the at least one of the estimated size of the ECU, the estimated weight of the ECU, the estimated cost of the ECU, the estimated power consumption of the ECU, and the estimated number of component parts of the ECU, for the corresponding function allocation pattern is below a predetermined threshold value.

10. The ECU evaluation apparatus as claimed in claim 1, wherein
the evaluation amount calculation section is further configured to determine, for each of the function allocation patterns, based on the predetermined ECU installation positions corresponding to the vehicle, an amount of wiring in wiring paths of a wiring harness required for implementing the function allocation pattern; and
the evaluation section is further configured to determine the optimum function allocation pattern for the ECUs installed at the predetermined ECU installation positions, further based on the amount of wiring determined for each of the function allocation patterns,
wherein the predetermined ECU installation positions are set, and thereafter the evaluation amount calculation section calculates the evaluation amounts and the evaluation section selects the optimum allocation pattern.

11. The ECU evaluation apparatus as claimed in claim 1, wherein
wherein the predetermined ECU installation positions are set, and
thereafter the evaluation amount calculation section calculates the evaluation amounts and the evaluation section selects the optimum allocation pattern further based on an amount of wiring in a wiring harness required for each of the function allocation patterns.

12. An method for allocating a plurality of functions to a plurality of ECUs installed at respective predetermined positions in a vehicle, comprising:
in an ECU evaluation apparatus comprising an input device, a memory, and at least one microcomputer coupled to the memory and the input device, wherein the memory comprises program code stored beforehand in the memory, executing the program code by the microcomputer to perform the following:
in a function allocation section, allocating the plurality of functions to respective ones of the ECUs;
in a component part selection section, selecting component parts to constitute each of the ECUs, the selection performed in accordance with the plurality of functions allocated to the respective ECUs by the function allocation section;
in an evaluation amount calculation section, calculating evaluation amounts with respect to each of the ECU s, the evaluation amounts comprising at least one of an estimated size of the ECU, an estimated weight of the ECU, an estimated cost of the ECU, an estimated power consumption of the ECU, and an estimated number of component parts of the ECU; and,
in an evaluation section, evaluating a suitability of the allocation of the plurality of functions by the function allocation section, the evaluation based upon the evaluation amounts calculated by the evaluation amount calculation section;
wherein
the input device is operable by a user for specifying at least one aspect of the plurality of ECUs as an aspect to be assigned a relatively high priority when allocating the functions to the ECUs;
the function allocation section is configured to predetermine a plurality of patterns of allocation of the plurality of functions to the ECUs, and to apply each of the function allocation patterns in succession to the ECUs for thereby obtaining from the evaluation amount calculation section a plurality of sets of evaluation amounts, the plurality of sets of evaluation amounts respectively corresponding to the function allocation patterns, the evaluation amount calculation section is configured to determine, in accordance with the specified aspect, a plurality of weighting factors corresponding to respective categories of the evaluation amounts and, for each of the function allocation patterns, multiply each of the corresponding evaluation amounts by the corresponding weighting factor, to obtain respective weighted evaluation amounts, and calculate a sum total of the weighted evaluation amounts corresponding to the function allocation pattern, and the evaluation section is configured to compare the respective values of sum total of weighted evaluation amounts obtained for the function allocation patterns, and determine an optimum function allocation pattern as a function allocation pattern corresponding to a smallest value of sum total of weighted evaluation amounts, and the evaluation amount calculation section is configured to allocate the plurality of functions to the ECUs in accordance with the optimum function allocation pattern;

determining wiring for wiring paths of a wiring harness connecting the ECUs in the vehicle, and thereafter applying the optimum function allocation pattern which is determined to the ECUs installed at respective predetermined ECU installation positions in the vehicle by configuring each ECU with functions based on the optimum function allocation pattern.

\* \* \* \* \*